Sept. 7, 1937. E. N. COLE 2,092,571
VIBRATION DAMPER
Filed Sept. 26, 1936 2 Sheets-Sheet 1

Inventor
Edward N. Cole
By Blackmore, Spencer & Hulse
Attorneys

Sept. 7, 1937.  E. N. COLE  2,092,571
VIBRATION DAMPER
Filed Sept. 26, 1936  2 Sheets-Sheet 2

Inventor
Edward N. Cole
By Blackmore, Spencer & Flint
Attorneys

Patented Sept. 7, 1937

2,092,571

UNITED STATES PATENT OFFICE 2,092,571

VIBRATION DAMPER

Edward N. Cole, Detroit, Mich., assignor to General Motors Corporation, Detroit, Mich., a corporation of Delaware Application September 26, 1936, Serial No. 102,663

17 Claims. (Cl. 74—574)

This invention relates to means for suppressing torsional vibrations. Although it is of much broader application, the invention is intended particularly for attachment to the crankshaft of an internal combustion engine.

The objects are to simplify the construction and manufacture of vibration suppressors and improve their operation.

The invention consists in apparatus for damping torsional vibrations of a shaft by means of friction between an inertia body and a driving plate fixed to the shaft and provided with torsionally yieldable elastic parts to which the inertia body is attached.

In the accompanying drawings in which like reference characters indicate like parts throughout the several views, Fig. 1 is a side elevation of an engine crankshaft having the damping means of this invention attached to its front end;

Figure 1:
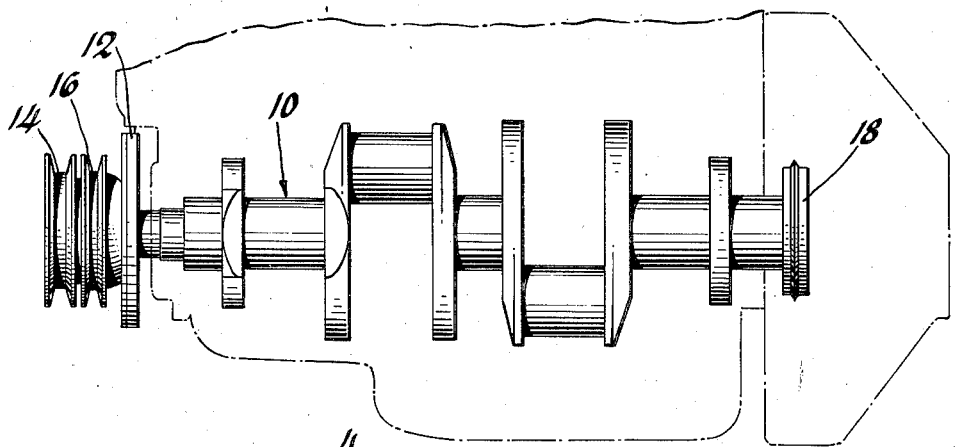

In Fig. 1, numeral 10 indicates an engine crankshaft for an eight cylinder, 90 degrees, V-type engine adapted to carry the usual flywheel on its rear end and, on its front end, suitable means for damping torsional vibrations and suitable means for driving a generator and an engine cooling fan. The damping means is indicated as a whole by numeral 12, a fan driving pulley by numeral 14 and a generator driving pulley by numeral 16. The flywheel and the engine driven element of the main clutch (not shown) are designed to be affixed to the flange 18 at the rear end. Although illustrated as attached to the crankshaft of a V-type engine the damping means of this invention is equally well adapted for attachment to crankshaft of other types of engines or to other shafts that may be subject to torsional vibrations.

Figure 2:
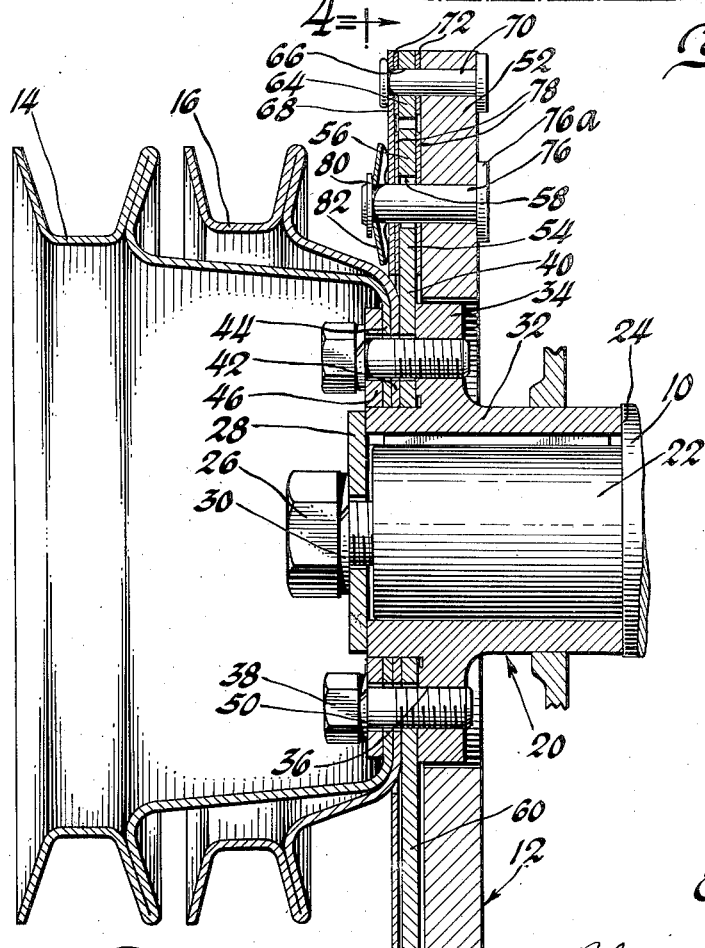
Fig. 2 is a longitudinal section through a hublike fixture keyed to the front end of said crankshaft, and through a fan pulley, generator pulley and damping means carried by said fixture.

In Fig. 2 numeral 20 indicates a hub-like fixture keyed to the reduced front end 22 of crankshaft 10 for the purpose of connecting said parts 12, 14 and 16 to said shaft. The fixture is held firmly against the shoulder 24 by any suitable means, such as an annular presser plate 28 engaged by the head of a screw bolt 26 tapped into the end of the shaft. The shank of bolt 26 passes through annular presser plate 28 and a lock washer 30 disposed between the bolt head and plate, thus forcing the outer zone of the plate against the front end of the tubular body 32 of said fixture 20, and holding it firmly against said shoulder. Fixture 20 is provided with a stout flange 34, to which the several parts carried by the fixture are secured, and which is pierced by a number of threaded holes 36, preferably six in number, for receiving bolts 38 that secure said parts in place.

Sleeved over the tubular body 32 of fixture 20 in front of flange 34 are: a torsion plate 40 which constitutes an essential element of the vibration damper to be presently described; the inner flanges 42 and 44 of the cup-like bodies of the fan and generator pulleys 14 and 16 respectively, and a flat clamping ring 46. All four of the parts last named are pierced to permit the passage of the bolts 38 by which they are rigidly secured to the flange 34, the parts 40, 42 and 44 being squeezed between flange 34 and clamping ring 46. Suitable lock washers 50 prevent bolts 38 from becoming loose.

The marginal portion of torsion plate 40, which is elastically yieldable in the plane of rotation of said plate while the inner portion is relatively unyieldable in said plane, supports an inertia body consisting of a relatively heavy annular member 52, and a damping plate 68 pin-connected to said inertia body. Torsion plate 40, therefore, provides an elastic connection between the inertia body and the crankshaft, so that said body may rotate at a substantially uniform rate although the crankshaft may be subject to torsional vibrations. Between the inertia body and relatively unyielding portions of the torsion plate frictional means are provided that tend to damp torsional vibrations when they occur and steady the rotation of the shaft. Thus the damping of shaft vibrations is effected by friction between the inertia body 52 and associated parts on the one hand, and the torsion plate or carrier, by which it is connected to the shaft on the other hand.

Figure 4:
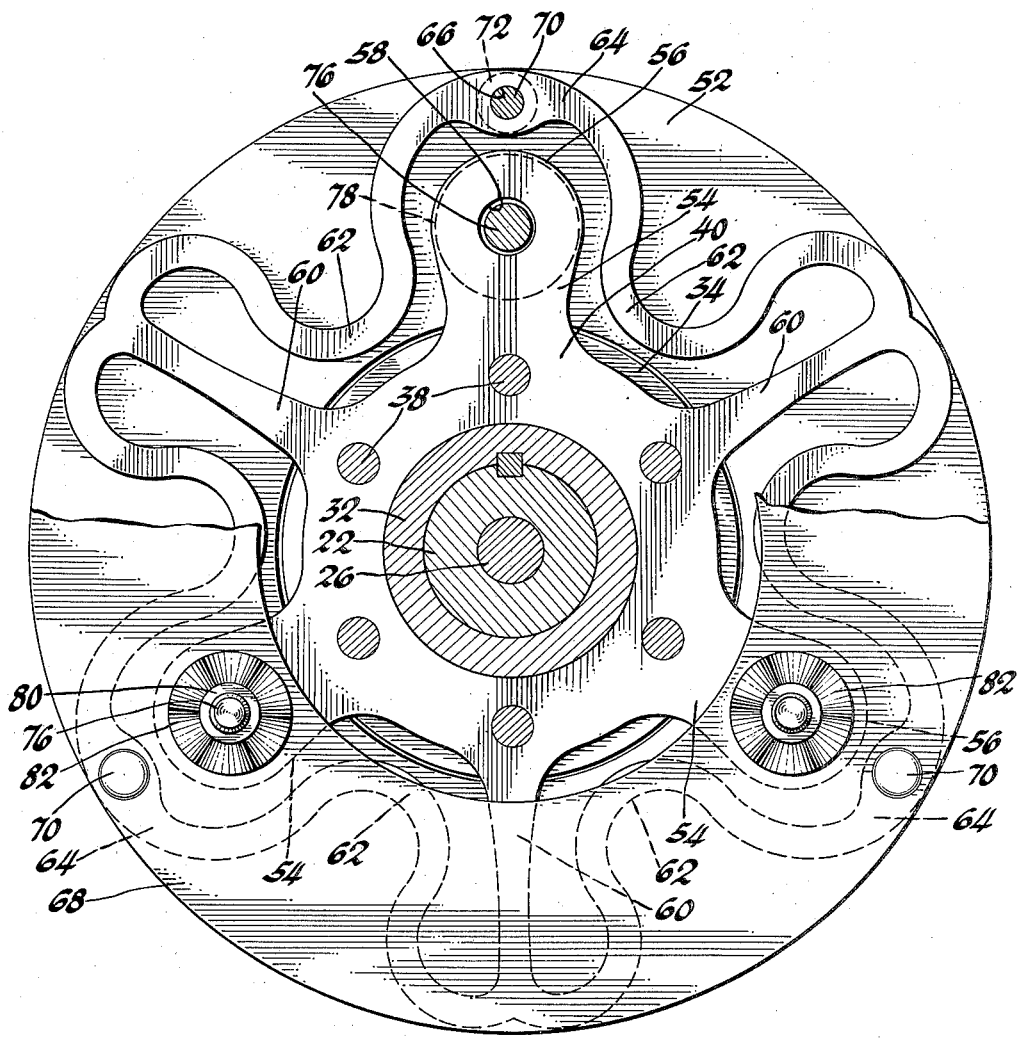
Fig. 4 is a sectional view taken on line 4—4 of Fig. 1, with parts broken away.

The form and construction of the torsion plate is best shown in Fig. 4, which, in connection with Fig. 2, clearly illustrates the means and manner by which damping of torsional vibrations is effected.

As shown in Fig. 4 there are three relatively short and wide arms 54 radiating from the central part of the torsion plate that is pierced for the passage of the six bolts 38. Arms 54 have rounded ends 56 that will be referred to as pads, and have central holes 58. The arms 54 are equiangularly spaced, being 120 degrees apart, and are relatively rigid.

Alternating with the short rigid arms 54 are relatively long slender arms 60 elastic in the plane of the plate, and likewise three in number equally spaced from each other and from the relatively rigid arms 54. Between the outer ends of arms 60 the marginal portion of plate 40 consists of sinuous elastic portions spaced by approximately corresponding sinous openings from the inner portion of the plate and arms. Each sinuous marginal portion bridging the gap between two adjacent arms 60 consists of two loops 62 curving inward between rigid arm 54 and the elastic arms 60 adjacent said rigid arm, and a third outward curving loop 64 arching around the end of rigid arm 54. Loops 64 are perforated to form holes 66 disposed in radial alinement with said holes 58 in the pads 56 of arms 54.

At the front of torsion plate 40 is an annular flat plate 68, hereinbefore called a damping plate, shown in the lower half of Fig. 4, but broken away in the upper half to reveal clearly the form of torsion plate 40 with respect to the rigid arms 54, elastic arms 60 and the sinuous elastic marginal portions between the ends of said elastic arms. Damping plate 68 has holes arranged to register with said holes 58 and 66 in the torsion plate 40 when assembled.

Figure 5:
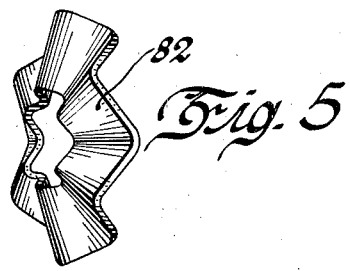
Fig. 5 is a perspective of a spring washer for elastically pressing together the damping elements.

Inertia body 52 is attached to the torsion plate 40 by means of penetrating pin fasteners such as bolts or rivets 70, which pass snugly through the holes 66 in the torsion plate and snugly through the registering holes corresponding in the inertia body 52 and damping plate 68. Washers 72 appropriately space the inertia mass and damping plate from the torsion plate as shown in Fig. 2. The inertia body is therefore attached to the torsion plate at the bends of the loops 64 in the elastic sinuous outer portion of the plate that are connected to the central portion thereof only through the elastic arms 60, the attaching points between torsion plate and body being radially in line with the centers of pads 56 on the rigid arms 54 of said plate. Damping plate 68 is functionally a rigid part of the inertia body giving to the total inertia mass two sets of friction surfaces, one on each side of the torsion plate. Headed pin-fasteners such as bolts or rivets 76, the shanks of which are smaller in diameter than the holes 58 in the pads 56 of arms 54 of the torsion plate, pass loosely through these holes and fit snugly in the corresponding registering holes in inertia body 52 and damping plate 68. Friction washers 78, preferably of bronze, space the inertia mass and the damping plate from the said pads 56. The pin fasteners 76 are provided with suitable retaining enlargements 80 on the ends opposite their heads 76a, between which enlargements 80 and the front face of damping plate 68 stiff springs 82 are disposed. Springs 82 may be in the form of dished and radially corrugated elastic washers shown in Fig. 5. The fasteners 76 are illustrated as shouldered rivets, over the reduced ends of which riveting burrs are sleeved and locked in place by upsetting the protruding reduced ends of the rivets thereby forming the enlarged retaining ends 80.

By means of the construction described non-uniform rotation of the forward end of the crankshaft tends to revolve the torsion plate 40 non-uniformly,—the arms 54 and pads 56 more so than the elastic marginal portion steadied by the inertia mass—thus tending to cause relative variations of movement between the pads and the more uniformly rotating inertia mass connected to the elastic loop 64 of the sinuous outer portion of the torsion plate. These variations, or torsional vibratory movements of the shaft, are damped owing to the friction exerted by the friction washers 78 on opposite sides of the pads 56 confined under constant compression exerted by the springs 82 between the inertia body 52 and damping plate 68.

Figure 3:
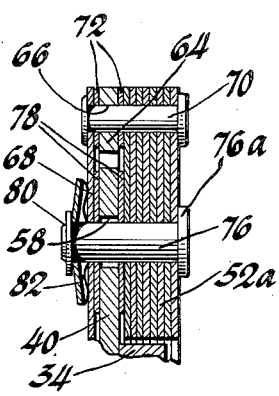
Fig. 3 is a sectional view of a modification.

The spacing washers 72 surrounding the pin fasteners 70 permit relative freedom of angular movement of the marginal portion of torsion plate 40 and inertia body 52, while the friction between washers 78 clamped between the inertia body, damping plate and torsion plate, tend to resist relative movement of inertia body and torsion plate. The body 52 shown in Fig. 2 is intended to consist of a machined casting. In some cases it may be more economical to make the body in layers, as of assembled flat rings 52a stamped from steel or other metal sheets, as illustrated in Fig. 3. In the latter case the weight of the body may very readily be adjusted or tuned to the periodicity of a particular crankshaft by increasing or decreasing the number of flat rings or annular layers assembled.

I claim:

1. The combination of a rotatable member capable of vibrating torsionally, an inertia body, a metallic plate for supporting and imparting rotation to said inertia body, said plate having an inner portion relatively unyieldable in the plane of rotation thereof fixedly secured to said rotatable member, and an outer portion connected to said inner portion by a part of the plate elastically yieldable in the plane of rotation, means for attaching the inertia body to the outer yieldable portion of said plate, and damping means coacting with said inertia body and the inner relatively unyieldable portion of said plate.

2. A combination as defined in claim 1 in which the damping means includes a layer of friction material between said inertia body and the relatively unyieldable portion of said plate in rubbing engagement with both.

3. The combination of a rotatable member capable of vibrating torsionally, an inertia body, a damping plate, means fixedly secured to said rotatable member for supporting and imparting rotation to said inertia body and damping plate, said supporting means having a portion relatively yieldable and a portion relatively unyieldable in the plane of rotation thereof, means for attaching said inertia body and damping plate to the yieldable portion of said supporting means at opposite sides thereof, and means for providing rubbing friction between the relatively unyieldable portion of said supporting means, the inertia body and the damping plate.

4. A combination as defined in claim 3 in which the inertia body and damping plate are attached to the yieldable portion of said supporting means at opposite sides by fastening pins fitted snugly in registering holes in said supporting means, inertia body and damping plate.

5. A combination as defined in claim 3 in which the inertia body and damping plate are attached to the yieldable portion of said supporting means at opposite sides thereof by fastening pins extending through them and the means for providing rubbing friction between the relatively unyieldable portion of the supporting means, damping plate and inertia body comprises pins passing loosely through and providing for limited movement of the supporting means with respect to the inertia body and damping plate.

6. The combination of a rotatable member capable of vibrating torsionally, an inertia body surrounding the axis of said member, a torsion plate secured to said rotatable member supporting and imparting rotation to said inertia body, said torsion plate having a relatively unyieldable inner portion and a marginal portion relatively yieldable in the plane of rotation thereof, means for attaching the inertia body to said yieldable marginal portion of the torsion plate so that the body overlaps said relatively unyieldable portion of the plate, and means for producing friction between said body and the unyieldable portion of said plate.

7. A combination as defined in claim 6 in which the relatively unyieldable portion of the torsion plate and inertia body are associated with interposed friction surfaces which are urged into contact by pin fasteners passing through holes in said plate and body, one of said holes of each pair being larger than the pin for allowing relative rubbing movement, there being springs reacting between the pin fasteners, inertia body and torsion plate tending to press said plate and body toward each other.

8. A combination as defined in claim 6 with the addition of an annular damping plate attached to the yieldable marginal portion of said torsion plate on the side opposite to that on which the inertia body is attached.

9. A combination as defined in claim 6 with the addition of a damping plate attached to said yieldable marginal portion of the torsion plate on the side opposite that on which the inertia body is disposed by means of pin fasteners extending snugly through holes in the damping plate, torsion plate and inertia body, and pin fasteners extending through holes in damping plate, inertia body and relatively unyieldable portion of the torsion plate, said holes being of suitable form and size to permit relative movement of the unyieldable portion of the torsion plate with respect to the inertia body and damping plate and springs engaging said last-named pins for urging together the torsion plate, damping plate and inertia body.

10. The combination of a rotatable member capable of vibrating torsionally, an inertia body surrounding the axis of said member, a torsion plate attached to said member for supporting and rotating said inetria body, said torsion plate having a marginal portion yieldable in the plane of rotation and a relatively unyieldable portion radially inward of said marginal portion, fastening pins for attaching the inertia body to said marginal portion of the torsion plate, means for spacing apart the inertia body and torsion plate at the location of the fastening pins, friction washers disposed between said inertia body and the relatively unyieldable portion of said torsion plate, and means for holding said inertia body and torsional plate in contact with said friction washers.

11. A combination as defined in claim 10 together with an annular damping plate attached by said fastening pins to said yieldable marginal portion of the torsion plate on the side opposite said inertia body, means for spacing apart the damping plate and torsion plate at the locations of the fastening pins, and friction washers disposed between said damping plate and the relatively unyieldable portion of the torsion plate.

12. Torsional vibration damping means of the kind described, comprising an inertia body, a torsional plate having an outer marginal portion having arms relatively yieldable in the plane of rotation of the plate and an inner relatively unyieldable portion, means for attaching the inertia body to the marginal portion of the plate, and damping means cooperating with the inertia body and the relatively unyielding portion of said plate.

13. Torsional vibration damping means as defined in claim 12 in which the yieldable marginal portion of the torsion plate comprises relatively elastic yieldable arms and elastic sinuous portions connecting the ends of said arms, the inertia body being attached to said sinuous portions.

14. Torsional vibration damping means as defined in claim 12 in which the yieldable marginal portion of the torsion plate comprises relatively elastic yieldable arms and elastic sinuous portions connecting said arms, said sinuous portions between adjacent yieldable arms having an outward curved central loop and an inward curved loop at each side of the central loop, the inertia body being attached to the central loop.

15. Torsional vibration damping means as defined in claim 12 in which the marginal portion of the torsion plate comprises relatively elastic yieldable arms and the inner portion of the torsion plate comprises relatively unyieldable arms extending outward between said yieldable arms, said damping means being arranged to cooperate with said inertia body and said relatively unyieldable outward extending arms.

16. Torsional vibration damping means as defined in claim 12 in which the inner portion of the torsion plate comprises relatively unyieldable arms extending outward and having friction pads at their ends and the marginal portion comprises relatively yieldable arms alternating with said relatively unyieldable arms and sinuous portions between said relatively yieldable arms, said sinuous portions comprising loops arched around pads on said relatively unyieldable arms and attached to said inertia body, there being means for maintaining frictional engagement between said pads and said inertia mass.

17. The combination of a rotatable member capable of vibrating torsionally, a torsion plate secured to said member so as to rotate therewith, said torsion plate having a central portion with relatively rigid arms alternating with relatively yieldable elastic arms radiating therefrom; an elastic marginal portion of sinuous form joined to the ends of said relatively elastic yieldable arms and having portions looped around the ends of said relatively rigid arms and between the latter and said elastic yieldable arms; an annular inertia body; pins connecting said inertia body to one side of the loops of said sinuous marginal portion at points radially outward of said rigid arms; an annular damping plate connected by said pins to the other side of said loops; spacing means disposed between said loops, damping plate and inertia body around the connecting pins; friction means disposed between the relatively rigid arms of the torsion plate, the damping plate and the inertia body, and means for elastically pressing together the damping plate, inertia body and relatively rigid arms of the torsion plate.

EDWARD N. COLE.